United States Patent
Neugeboren et al.

(10) Patent No.: US 12,041,155 B2
(45) Date of Patent: Jul. 16, 2024

(54) PACKET TIMING SYSTEM WITH IMPROVED HOP COUNT

(71) Applicant: ARRIS Enterprises LLC, Suwanee, GA (US)

(72) Inventors: Yair Neugeboren, Netanya (IL); Chris Zettinger, Wheaton, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 282 days.

(21) Appl. No.: 17/202,099

(22) Filed: Mar. 15, 2021

(65) Prior Publication Data

US 2021/0288784 A1 Sep. 16, 2021

Related U.S. Application Data

(60) Provisional application No. 62/989,174, filed on Mar. 13, 2020.

(51) Int. Cl.
*H04J 3/12* (2006.01)
*H04J 3/06* (2006.01)
*H04L 7/00* (2006.01)

(52) U.S. Cl.
CPC .............. *H04L 7/0079* (2013.01); *H04J 3/06* (2013.01)

(58) Field of Classification Search
CPC ..... H04L 7/0079; H04J 3/0641; H04J 3/0667; H04J 3/0608; H04J 3/0605; H04J 3/0602; H04J 3/06; H04Q 11/04
See application file for complete search history.

(56) References Cited

U.S. PATENT DOCUMENTS

| | | | |
|---|---|---|---|
| 5,345,583 A * | 9/1994 | Davis | G06F 11/0757 714/E11.003 |
| 8,954,609 B1 | 2/2015 | Holleman et al. | |
| 9,876,596 B2 * | 1/2018 | Xia | H04L 41/06 |
| 9,998,247 B1 * | 6/2018 | Choudhury | H04J 3/0602 |
| 11,032,056 B2 * | 6/2021 | Kemparaj | H04J 3/0667 |
| 2015/0113174 A1 * | 4/2015 | Yang | H04L 67/1095 709/248 |
| 2015/0127978 A1 * | 5/2015 | Cui | H04J 3/0641 714/15 |
| 2015/0318941 A1 | 11/2015 | Zheng et al. | |
| 2016/0227002 A1 * | 8/2016 | Lin | H04L 67/141 |
| 2016/0277138 A1 * | 9/2016 | Garg | H04L 41/0816 |

(Continued)

FOREIGN PATENT DOCUMENTS

| | | | | |
|---|---|---|---|---|
| CN | 102377663 A * | 3/2012 | | H04J 3/0667 |
| CN | 103051439 B | 10/2017 | | |

OTHER PUBLICATIONS

IP Networking Guide for Video and Audio Application, Lawo, Jun. 17, 2019, pp. 1-52 (Year: 2019).*

(Continued)

*Primary Examiner* — Phuongchau Ba Nguyen
(74) *Attorney, Agent, or Firm* — Chernoff, Vilhauer, McClung & Stenzel, LLP

(57) ABSTRACT

Devices and methods that receive timing information from at least one source clock in a network that exchanges data packets conforming to the Internet Protocol. The timing information preferably includes a time-to-live (TTL) field in a packet header used to: select a source of timing information; configure a PTP port, or both.

20 Claims, 3 Drawing Sheets

(56) References Cited

U.S. PATENT DOCUMENTS

2019/0081720 A1\* 3/2019 Barry .................. H04J 3/0667

OTHER PUBLICATIONS

Data-Over-Cable Service Interface Specifications DCA-MHAv2, Remote Docsis Timing Interface, CM-SP-R-DTI-I07-180509, Cable Television Laboratories, Inc., 2018, pp. 1-44 (Year: 2018).\*
Cisco IE 2000 Software Configuration Guide, Release 15.0(2) EA, Chapter 8: Configuring PTP, Cisco, Oct. 22, 2019, pp. 8-1 to 8-4. (Year: 2019).\*
Thomas Kernen and Nikolaus Kero, Using PTP for Time and Frequency in Broadcast Applications, Part 2: PTP Clock Characteristics, Nov. 2019, EBU Operating Eurovision and Euroradio, pp. 1-13 (Year: 2019).\*
International Search Report and Written Opinion Re: Application No. PCT/US2021/022418 (dated Jun. 30, 2021).

\* cited by examiner

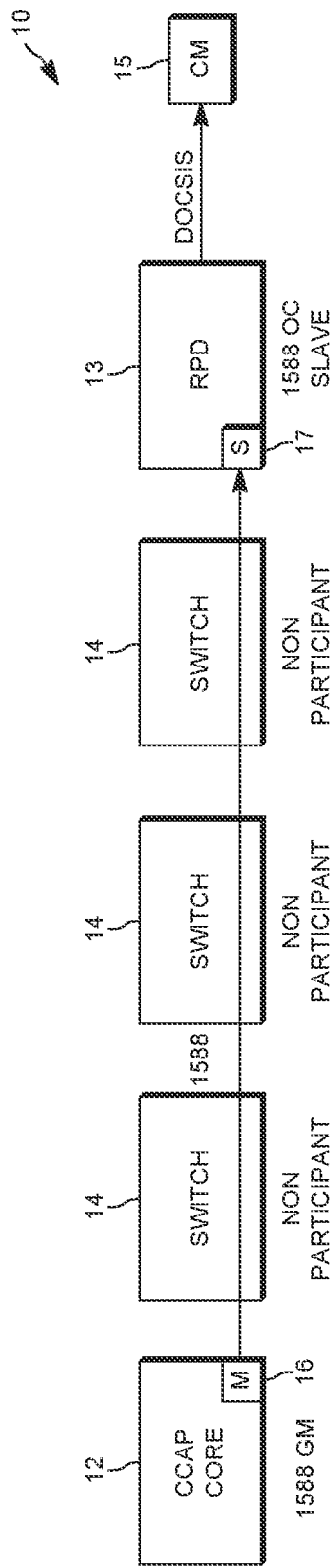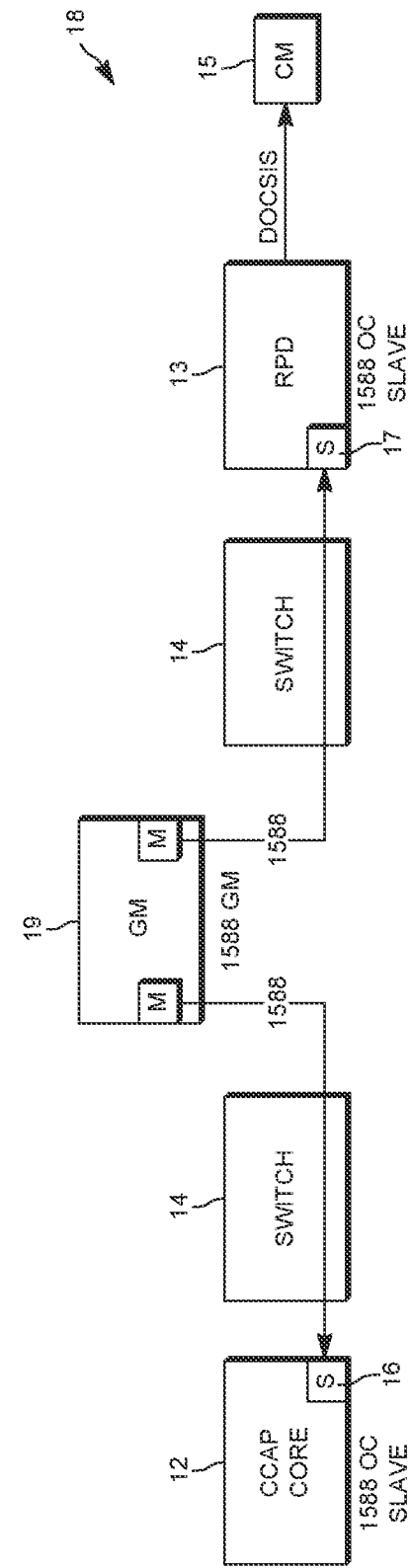

PACKET TIMING SYSTEM WITH IMPROVED HOP COUNT

CROSS REFERENCE TO RELATED APPLICATIONS

This application claims benefit of U.S. Provisional Patent Application No. 62/989,174, entitled "PACKET TIMING SYSTEM WITH IMPROVED HOP COUNT," by Yair Neugeboren and Chris Zettinger filed Mar. 13, 2020, which application is hereby incorporated by reference herein.

BACKGROUND

The subject matter of this application generally relates to timing protocols for electronic systems by which different devices must communicate synchronously with each other.

A multitude of modern computer or other electronic applications require synchronization of the behavior of distributed components. As just one example, telephone, Internet, or other data communication networks typically require a high degree of synchronization between network elements to properly implement network functionality, and to that end synchronization protocols such as the Precision Timing Protocol (PTP) have been promulgated in order to provide for such synchronization. PTP (as specified in IEEE-1588v2), is generally used for applications that require high levels of precision (e.g., such as industrial automation networks, testing and measurement networks, telecommunications networks, etc.) and is capable of providing timing synchronization on the order of nanoseconds. PTP is a packet-based synchronization method that transfers time and frequency references using packets containing time-stamps between elements in the network. The time stamps, in general, are associated with the time-of-arrival and time-of-departure of the packets, which the network elements use to perform synchronization.

A typical PTP deployment generally may include master clocks, slave clocks, boundary clocks and/or grandmaster clocks to provide timing synchronization. A master clock provides the reference point, e.g. time stamps, that one or more slave clocks utilize in order to perform synchronization. A master clock may be itself synchronized to a primary reference clock such as an atomic clock, GPS, etc., which is referred to generally as a grandmaster clock, typically used as the root timing reference. A boundary clock is one that has both slave and master functions, and transfers time in a relay fashion. For example, a boundary clock may act as a slave clock to a master clock, but also as a master clock to one or more slave clocks in the network.

Timing protocols such as PTP, however, rely on the assumption of a constant flight time of messages between a master clock and a slave clock. This assumption is often inaccurate as network congestion conditions may change unpredictably in, for example, a packet switched network. These unpredictable changes in flight time may in turn adversely affect the synchronization that a communication network relies on.

What is desired, therefore, are improved systems and methods for synchronization in communications networks.

BRIEF DESCRIPTION OF THE DRAWINGS

For a better understanding of the invention, and to show how the same may be carried into effect, reference will now be made, by way of example, to the accompanying drawings, in which:

FIGS. 1A and 1B show alternative communications architectures where a CCAP core is used to synchronously schedule transmissions to and from a plurality of cable modems, used to illustrate the benefits of the disclosed systems and methods.

DETAILED DESCRIPTION

Figure 2:
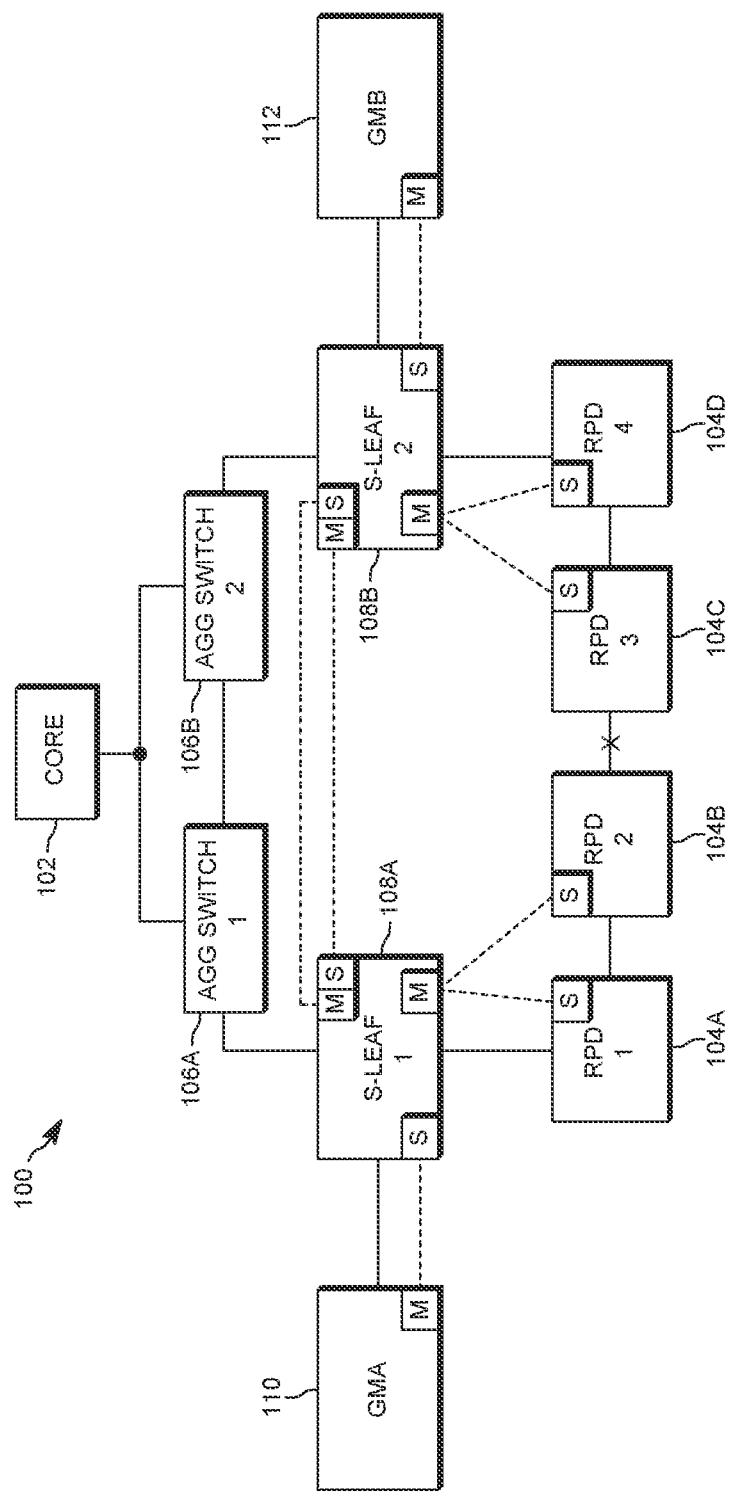
FIG. 2 shows a communications architecture having multiple grandmaster clocks for redundancy, with PTP-aware switching.

For purposes of the disclosure and the claims, the following terms are defined to as to more easily understand the subject matter described and claimed:

Grandmaster Clock: a clock that only operates as a master clock and is the source of time to the packet network.

Master Clock: a clock that sends timing information to a slave clock for that clock to synchronize its time to that of the master clock.

Slave Clock: a clock that receives timing information from a master clock to synchronize its time to that of the master clock.

Boundary Clock: a clock operates as both a slave and a master by having one port in a slave state receiving time from a master clock, and one or more ports in a master state which disseminate timing information to slaves.

Precision Time Protocol (PTP): PTP is a protocol defined in the IEEE 1588 standard, used to synchronize clocks throughout a computerized communications network, achieving clock accuracy in the sub-microsecond range.

PTP port(s): a physical, logical, or virtual interface supporting PTP and handling PTP communications. PTP ports can be configured as any of a master port that sends timing information to a PTP port of another network device, a slave port that receives timing information from a PTP port of another network device, or a passive port that neither sends or receives timing information.

Best Master Clock Algorithm (BMCA): BMCA is a procedure implemented by each PTP clock in a network to determine which, of all clocks available to it (including itself) to use as a timing reference.

As indicated earlier, many different electronic applications rely on the synchronized behavior of various components that may be separated from each other, even over extremely large distances. As just one example, modern CATV and other data communications architectures deliver content from a central distribution center to a large number of individual customers through a network of multiplexers, splitters, nodes, and amplifiers. Many of these architectures distribute network functionality in a manner that separates the physical devices that perform network operations (such as converting an input data stream to a Quadrature Amplitude Modulated (QAM) signal, for example) from the control layers that coordinate the behavior of the different devices. Such distributed architectures include R-PHY systems, R-MACPHY systems, R-PON systems, among many other variations. In such distributed architectures, the clocks of the physical devices and those of the control devices must be synchronized for time scheduling of data transfers to work properly.

FIGS. 1A and 1B, for example, show two different architectures for an R-PHY system. Those of ordinary skill in the art will understand that, although FIGS. 1A and 1B are shown to illustrate one application in which synchronization between different devices is essential to proper operation of the system, many other applications similarly rely on such synchronization, and the systems and methods disclosed herein are applicable to any application that relies upon precise synchronization between different devices.

Referring to FIG. 1A, for example, a first topology 1 may include a Converged Cable Access Platform (CCAP) core 2 synchronized with a Remote Physical Device (RPD) 3 connected together via a plurality of network switches 4. The RPD 3 is in turn connected to one or more cable modems 5. Synchronization is attained by a grandmaster clock 6 in the core 2 which sends timing information to a slave clock 7 in the RPD 3. Those of ordinary skill in the art will appreciate that, although FIG. 1A shows only one RPD 3 connected to the core 2, many such RPDs may be simultaneously connected to the core 2, with each RPD having a slave clock 7 receiving timing information from the grandmaster clock 6 in the core.

FIG. 1B shows an alternate topology 18 to provide synchronization between a CCAP core 12 and an RPD 13, which again is connected to one or more cable modems 15. The topology 18 shown in FIG. 1B is usually more reliable than that shown in FIG. 1A. Unlike the system of FIG. 1A, a separate timing grandmaster device 19 provides timing information to both the CCAP core 12 and the RPD 13. Specifically, the timing grandmaster 19 has a first master port connected to a slave clock 16 in the CCAP core 12 and a second master port connected to a slave clock 17 in the RPD 16. Those of ordinary skill in the art will recognize that the respective clocks of the CCAP core 12 and the RPD 15 may both be connected to a single master port in the timing grandmaster device 19, and the use of separate timing ports in FIG. 1B is used merely to more easily describe the separate timing processes. The CCAP core 12 and the RPD 15 may be connected to the timing grandmaster 19 through one or more switches 14. Again, those of ordinary skill in the art will appreciate that, although FIG. 1B shows only one RPD 15 connected to the timing grandmaster 19, many such RPDs may be simultaneously connected to the grandmaster 19, with each RPD having a slave clock 17 receiving timing information from a port in the grandmaster clock 19.

The CCAP core 12 operates as a Medium Access Control (MAC) layer in an R-PHY system and is responsible for creating and periodically sending downstream bandwidth allocation map (MAP) messages. A MAP message contains information that indicates when the various cable modems can transmit and for how long, so as to coordinate upstream transmissions among the network of cable modems 17. In turn, both the RPDs 15 and the cable modems 17 use the received MAP messages to determine when each cable modem 17 may gain access to the upstream channel and transmit packets in the upstream direction. The CCAP core 12 needs to send MAP messages ahead of time, so the cable modem will not miss the transmit opportunity. Typically, the CCAP is configured with the maximum time needed for a MAP message to propagate through the HFC network to the RPDs 15 and the cable modems 17, so that the CCAP can make sure it transmits MAPs early enough to be usable when it arrives at the cable modem.

In order for the CCAP to send, and the RPDs 15 and Cable Modems 17 to receive the MAP messages and use them to schedule upstream transmissions on a precise schedule, the CCAP core 12, the RPDs 15, and the cable modems 17 must be precisely synchronized to the same timing information. To this end, the Precision Timing Protocol (PTP), and other such timing protocols, have been promulgated to provide for such synchronization. PTP specifically is capable of providing timing synchronization on the order of nanoseconds. PTP utilizes hardware time stamps to ensure devices are synchronized, where the hardware that performs the time stamps is dedicated to synchronization. Therefore, PTP networks have much sharper time resolutions than other software-based timing protocols and furthermore will time-stamp the amount of time that synchronization messages spend in each device, which accounts for device latency.

Many systems that utilize the PTP protocol include more than one grandmaster clock for purposed of redundancy, load-balancing of PTP messaging, and more consistent performance. FIG. 2, for example, shows a system 100 in which a CCAP core 102 communicates with RPDs 104a to 104d through a switching network comprising a plurality of aggregation switches 106a, 106b and S-Leaf switches 108a and 108b. Timing information to the RPDs 104a to 104d is provided by two available grandmaster clocks 110 and 112. Those of ordinary skill in the art will appreciate that FIG. 2 is a simplified diagram and that many actual communications networks will include many more aggregation switches, leaf switches, RPDs, and potentially many more grandmaster clocks.

In the system shown in FIG. 2, the aggregation switches 106a and 106b are connected to the CCAP core 102 and are PTP unaware, meaning that they do not participate in the exchange of time using the PTP protocol by including clocks. The S-leaf switches 108a, which connect the aggregation switches 108a, 108b to the RPDs 104a to 104b are PTP aware, and respectively include one or more clocks. For example, each of S-leaf switch 108a, 108b may operate as a boundary clock by having a slave port that receives timing information from a respective one of grandmaster clock 112, 112, while also including a master port that provides timing information to slave ports of one or more of RPDs 104a to 104d. Furthermore, each of S-leaf switches 108a, 108b may also preferably include an additional master port and an additional slave port for communication of timing information with each other. As explained later, these additional ports may configured as a passive port that does not relay timing information, but in the event that one of the grandmaster clocks 110, 112 goes offline or otherwise malfunctions, the respectively appropriate ports may be activated so that any S-Leaf switch may continue to have a slave port that receives timing information from a remaining grandmaster clock in the network.

Furthermore, the RPDs 104a to 104s are PTP unaware for traffic being sent through them to another RPD. However, to avoid receiving data and timing information from separate paths, a discovery protocol operates to disable the connection between RPD 104b and RPD 104c.

In FIG. 2, solid lines represent communications paths between network elements, while the dashed lines represent timing relationships between clocks of network elements, where timing information is sent via a path represented by a solid line. For example, S-leaf switch 108a has one slave port capable of receiving timing information from a data connection to master port of grandmaster clock 110, but also includes another slave port capable of receiving timing information from grandmaster clock 112 via the data connections through S-leaf switch 108b, aggregation switch 106b, and aggregation switch 106a.

Because network elements, such as what was just described with respect to S-leaf switch 108a, may receive timing information from multiple grandmaster clocks over different ports and different paths, the PTP protocol defines a best Master Clock Algorithm (BMCA) that allows each network element to arbitrate which of all available grandmaster clocks provides the best timing information. The BMCA includes two key functions. First, based on the information received on its PTP port(s), the BMCA of a clock will select the best master, i.e. the clock source to which it will synchronise—which may include itself if the device has an oscillator. Second, each device uses the BMCA to determine the state of its own ports, thereby defining the master-slave hierarchy of the PTP system in a manner that avoids configurations with two masters or no masters for any given device. To this end, the PTP architecture, through the BMCA is used to set the state of each port in a device as a master, a slave, or a passive state. For example, again referencing S-leaf switch 108a, if that device determines that grandmaster clock 110 provides the best timing information, it will set the port connected to grandmaster clock 110 to a slave state, and will set the ports to aggregation switch 106a and RPD 104a to a master state, and set the port from aggregation switch 1 (receiving timing information from grandmaster clock 112) to a passive state.

When determining which grandmaster clock provides the best timing information, the BMCA considers a number of factors, including user-settable numerical fields representing the quality of a clock, clock class (i.e. a clock based on GPS, on mechanical mechanisms, etc), clock accuracy, and clock variance. The BMCA also includes another factor used when all other factors are equal, called "StepsRemoved," which counts the number of PTP-aware devices between the network device running the algorithm and the ultimate source of the timing information, i.e. the grandmaster clock. Thus, with respect to FIG. 2, the S-leaf switch 108—all other factors being equal—would select grandmaster clock 110 over grandmaster clock 112 because the former is only one step removed while the latter is two steps removed (the aggregation switches not being counted because they are PTP unaware. The opposite is true with respect to S-leaf switch 108b, which will select grandmaster clock 112 on the same logic. Thus, RPD 104a and 104b will receive timing information provided from grandmaster clock 110, while RPD 104c and 104d will receive timing information provided from grandmaster clock 112.

As noted above, message-based time and frequency transfer protocols, such as PTP, rely on the assumption of a constant delay between messaging between network elements, and a symmetrical delay in each direction between network elements—conditions that may not always be true. Variability in packet delay can therefore be a debilitating influence on network conditions, and for that reason selection of an appropriate source of timing information considers the number of network element timing information must be routed through, on the assumption that the more network elements timing information passes through, the more likely is unpredictable packet delay variation. In other words, all other factors being equal, better time and frequency transfer performance can be achieved by selecting the master clock whose distribution path contains fewer network elements.

Figure 3:
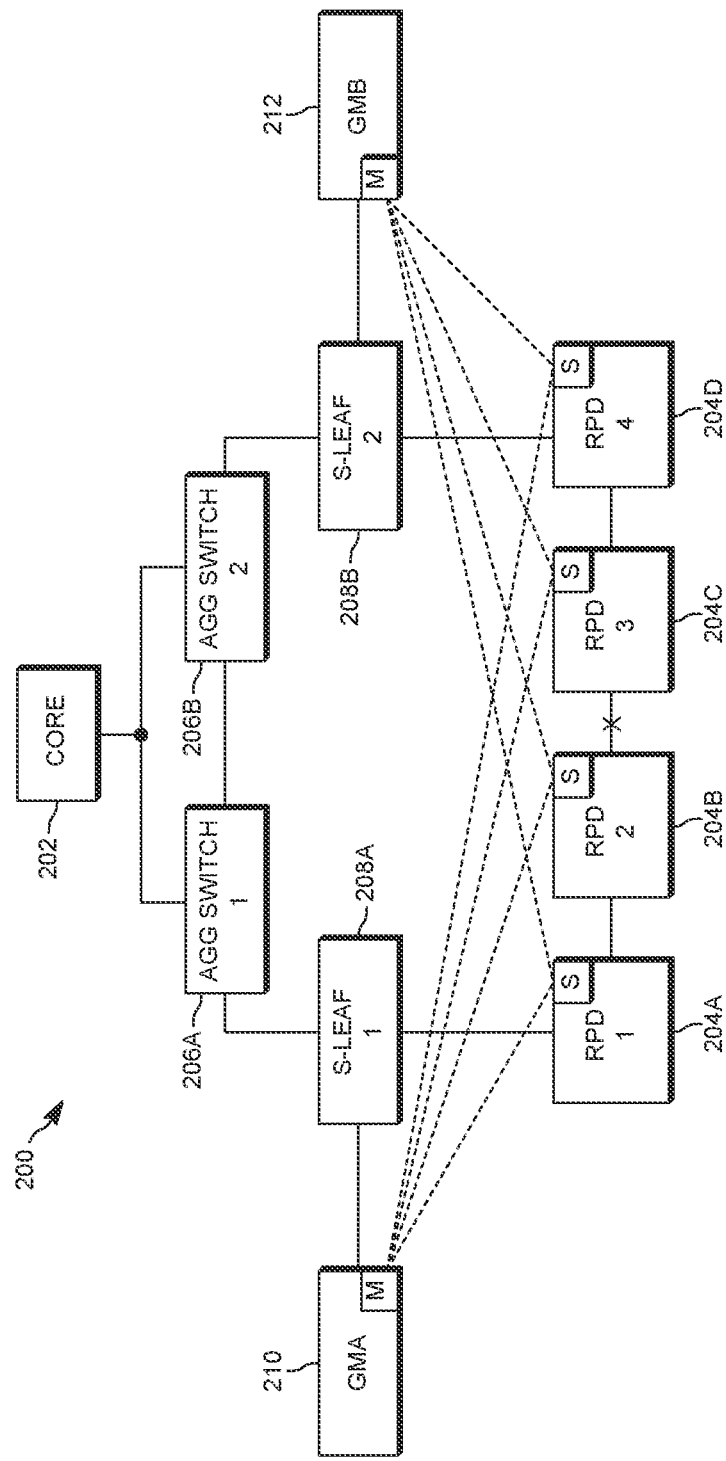
FIG. 3 shows a communications architecture having multiple grandmaster clocks for redundancy, with PTP-unaware switching.

As also noted above, the BMCA therefore includes a StepsRemoved determination to measure the number of network elements in a distribution path from a given original source of timing information, but the StepsRemoved determination only counts network elements that are PTP-aware. Referring to FIG. 3, for example, a system 200 may include a CCAP core 202 communicates with RPDs 204a to 204d through a switching network comprising a plurality of aggregation switches 206a, 206b and S-Leaf switches 208a and 208b. Timing information to the RPDs 204a to 204d is provided by two available grandmaster clocks 210 and 212. Those of ordinary skill in the art will again appreciate that FIG. 3 is a simplified diagram and that many actual communications networks will include many more aggregation switches, leaf switches, RPDs, and potentially many more grandmaster clocks.

In the system shown in FIG. 3, the aggregation switches 206a and 206b are connected to the CCAP core 202 and are PTP unaware, meaning that they do not participate in the exchange of time using the PTP protocol by including clocks. The S-leaf switches 208a, 208b, which connect the aggregation switch 206a to the RPDs 204a and 204b and the aggregation switch 206b to the RPDs 204c and 204d, respectively, are also PTP aware. Thus, unlike the system of FIG. 2, the StepsRemoved portion of the BCMA will not allow each of the RPDs 204a to 204d to distinguish between grandmaster clock 210 and grandmaster clock 212 because each grandmaster clock is only one step removed from each one of the RPDs 204a to 204d, even though, for example, timing information from grandmaster clock 212 must pass through four network elements to reach RPD 204a, while timing information from grandmaster clock 210 only has to pass through one network element to reach RPD 204a. Even though the BMCA considers a "source point ID field" to arbitrarily break a tie, this solution is less than ideal because that ID field may not point to the grandmaster clock with the best performance. Since networks may consist of a combination of PTP-aware and PTP-unaware equipment, a better selection decision may be provided if it were possible to quantify the number of network elements in the path to each Grand Master, irrespective of whether a network element were PTP aware.

Message-based time and frequency information may be transferred between network elements using layer 2 or layer 3 packets of Internet Protocol version 4 (IPv4) or version 6 (IPv6). IPv4 and IPv6 packets have a time-to-live field (TTL) defined within the packet header that is an 8-bit header decremented at each layer 3-aware network element. Time to live (TTL) limits the lifespan or lifetime of data in a computer or network. TTL may be implemented as a counter or timestamp attached to or embedded in the data. Once the prescribed event count or timespan has elapsed, data is discarded or revalidated. The purpose of the TTL field is to avoid a situation in which an undeliverable datagram keeps circulating indefinitely on an Internet system, such that the system eventually becomes clogged with undeliverable packets.

The present inventors realized that the TTL field of IP packets could serve a dual function within the BMCA. Thus, in one preferred embodiment, a modified BMCA may compare the TTL values in the received timing transfer packets to determine the number of layer 3 network elements in the path to each Grand Master, irrespective of whether a network element is or is not PTP aware, therefore obtaining more accurate data transfer and higher performance. The BMCA is then able to compare the master clocks data sets, and if they result in comparable quality levels, to break a tie by selecting the master clock with the higher valued TTL data.

Referring to FIG. 3, for example, by comparing TTL fields of data packets transmitted from grandmaster clock 210 against packets transmitted from grandmaster clock 212, RPDs 204a and 204b would select grandmaster clock 210 as a source of timing information because there are fewer level 3 network elements in the path to grandmaster clock 210. Similarly, by comparing TTL fields of data packets transmitted from grandmaster clock 210 against packets transmitted from grandmaster clock 212, RPDs 204c and 204d would select grandmaster clock 212 as a source of timing information because there are less level 3 network elements in the path to grandmaster clock 212. Assuming grandmaster clocks 210 and 212 exhibit identical performance, so that the TTL fields would be used to break the tie, this would be the preferred result to minimize variability in packet delay and would therefore achieve an advantage over use of the StepsRemoved calculation as the sole arbiter of breaking a tie.

In some embodiments, using the TTL field of IP packets to calculate the number of hops to a network element is used as a substitute for the StepsRemoved calculation. In other embodiments, the TTL field of IP packets may be used to break a tie after using the StepsRemoved calculation.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A device in a network that exchanges data packets conforming to the Internet Protocol, the device comprising:
   at least one Precision Timing Protocol (PTP) port capable of receiving timing information from at least one source clock remote from the device, the timing information provided using the data packets conforming to the Internet Protocol; and
   a processor capable of using a time-to-live (TTL) field from data packets received from at least one source clock to configure the at least one PTP port.

2. The device of claim 1 where the processor uses a Best Master Clock Algorithm (BMCA) to configure the at least one PTP port, and uses the TTL field as part of the BMCA.

3. The device of claim 2 where the BMCA used by the processor is free from using a StepRemoved calculation.

4. The device of claim 2 where the TTL field is selectively used after the processor uses a StepRemoved calculation.

5. The device of claim 1 where the Internet Protocol is IPv4.

6. The device of claim 1 where the Internet Protocol is IPv6.

7. The device of claim 1 where the processor uses the TTL field to determine a number of network elements between the device and each said at least one source clock.

8. The device of claim 1 where the processor is capable of determining the total number of PTP-aware and PTP-unaware network elements between the device and each said at least one source clock.

9. The device of claim 1 where the PTP port is configured to select a source of timing information for the device, from among a plurality of potential sources of timing information.

10. The device of claim 1 separated from the at least one source clock by a packet-switched network.

11. A method for configuring Precision Timing Protocol (PTP) ports in a network that exchanges data packets conforming to the Internet Protocol, the device comprising:
    delivering timing information to at least one PTP port of a device from at least one source clock remote from the PTP port, the timing information provided using the data packets conforming to the Internet Protocol; and
    using a time-to-live (TTL) field from data packets delivered by at least one source clock to configure the at least one PTP port.

12. The method of claim 11 where a Best Master Clock Algorithm (BMCA) is used to configure the at least one PTP port, and the TTL field is a part of the BMCA.

13. The method of claim 12 where the BMCA is free from including a StepRemoved calculation.

14. The method of claim 12 where the TTL field is selectively used after the StepRemoved calculation.

15. The method of claim 11 where the Internet Protocol is IPv4.

16. The method of claim 11 where the Internet Protocol is IPv6.

17. The method of claim 11 where the TTL field is used to determine a number of network elements between the device and each said at least one source clock.

18. The method of claim 11 where the processor is capable of determining the total number of PTP-aware and PTP-unaware network elements between the device and each said at least one source clock.

19. The method of claim 11 where the PTP port is configured to select a source of timing information for the device, from among a plurality of potential sources of timing information.

20. The method of claim 11 where the device is separated from the at least one source clock by a packet-switched network.

* * * * *